(12) United States Patent
Huschke et al.

(10) Patent No.: US 8,302,148 B2
(45) Date of Patent: Oct. 30, 2012

(54) TRANSMISSION OF COMPOSITE DIGITAL BROADCAST INFORMATION

(75) Inventors: Jörg Huschke, Aachen (DE); Ralf Tönjes, Osnabrück (DE); Uwe Horn, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 527 days.

(21) Appl. No.: 11/722,989

(22) PCT Filed: Dec. 22, 2004

(86) PCT No.: PCT/EP2004/014625
§ 371 (c)(1),
(2), (4) Date: Aug. 28, 2008

(87) PCT Pub. No.: WO2006/066607
PCT Pub. Date: Jun. 29, 2006

(65) Prior Publication Data
US 2009/0013365 A1 Jan. 8, 2009

(51) Int. Cl.
*H04N 7/16* (2011.01)
*H04N 7/173* (2011.01)
*H04J 1/10* (2006.01)
*H04J 3/08* (2006.01)
*H04J 3/04* (2006.01)
*H04J 3/02* (2006.01)
*H04J 3/22* (2006.01)

(52) U.S. Cl. ........ 725/149; 725/127; 370/315; 370/492; 370/501; 370/535; 370/536; 370/538; 370/539; 370/544

(58) Field of Classification Search .................. 725/127, 725/149; 370/315, 492, 501, 535, 536, 538, 370/539, 544
See application file for complete search history.

(56) References Cited

U.S. PATENT DOCUMENTS

| | | | | |
|---|---|---|---|---|
| 7,123,911 | B1 * | 10/2006 | Ngan | 455/435.2 |
| 2002/0059630 | A1 * | 5/2002 | Salo et al. | 725/108 |
| 2005/0232223 | A1 * | 10/2005 | Muller | 370/350 |
| 2007/0195868 | A1 * | 8/2007 | Walker et al. | 375/211 |

(Continued)

FOREIGN PATENT DOCUMENTS
EP 1337112 A 8/2003
(Continued)

OTHER PUBLICATIONS

Henriksson J: "DVB-H Outline" Online! Dec. 9, 2003; XP002296398 URL: http//www.dvb.org/documents/DVB-H_Outline.pdf>; pp. 11-18; 29-34.

(Continued)

*Primary Examiner* — Nasser Goodarzi
*Assistant Examiner* — Kyu Chae
(74) *Attorney, Agent, or Firm* — Roger S. Burleigh

(57) ABSTRACT

To improve transmission of digital broadcast information, there is proposed a method of transmitting digital broadcast information from a main transmitter (12) to at least one repeater (14). There is generated a composite digital broadcast signal carrying first digital broadcast information according to a first digital broadcast specification (DVB-T) and second digital broadcast information according to a second digital broadcast specification (DVB-H). The composite digital broadcast is then broadcasted such that the second digital broadcast information (DVB-H) is sent in a transmission mode used for transmission of the first digital broadcast information (DVB-T).

12 Claims, 9 Drawing Sheets

U.S. PATENT DOCUMENTS

2007/0249391 A1* 10/2007 van Rooyen ............... 455/552.1
2008/0170640 A1* 7/2008 Gao et al. ...................... 375/302

FOREIGN PATENT DOCUMENTS

JP      H10-032557      2/1998
JP      2000-101502     4/2000

OTHER PUBLICATIONS

Kornfeld M: "DVB-H—the emerging standard for mobile data communication" Consumer Electronics 2004 IEEE International Symposium on Reading, UK Sep. 1-3, 2004; Piscataway NJ USA IEEE; Sep. 1, 2004 pp. 193-198 XP010755771.

* cited by examiner

TRANSMISSION OF COMPOSITE DIGITAL BROADCAST INFORMATION

FIELD OF INVENTION

The present invention relates to transmission of composite digital broadcast information, i.e., digital broadcast information carrying audio, video, and multimedia information for forwarding to mobile devices.

BACKGROUND ART

Broadcasting of application contents to mobile devices based on a digital broadcasting standards is related to latest developments in delivering services to mobile devices like mobile phones, PDAs, etc. Based on digital broadcasting excellent performances are enabled and needs for reliable high speed, high data rate reception, etc. are met.

One digital broadcasting standard is the DVB-T broadcasting standard which issued in 1997 and was further enhanced through the DVB-H standard adapted to mobile handheld devices. The DVB-H standard considers aspects like battery life and improves performance for mobile handheld receivers.

Further, characteristics of the new digital video broadcasting handheld DVB-H standard are time slicing where the burst duration of data belonging to a particular user information data stream is extended, an OFDM 4K mode, and optionally additional forward error correction schemes for increase of robustness.

Therefore, broadcasting on the basis of either standard like DVB-T and/or DVB-H achieves an excellent reach of many users with a single, configurable service. The DVB-H standard combines broadcasting with a set of measures to ensure that mobile devices can operate from a battery on the move and offers multimedia services.

Typically, the standard DVB-H is an enhancement of the standard DVB-T to improve performance of digital broadcasting to mobile devices. Here, a good DVB-H standard type coverage, including indoor coverage, requires a higher density of transmitters and/or repeaters than for standard DVB-T coverage.

A cost efficient solution for the distribution of DVB-H information to repeaters is to use digital broadcasting from a main transmitter to the plurality of repeaters which can be deployed cost efficiently in the field.

However, problems arising with currently operative standards for transmission of digital broadcast information are the parallel handling of different standards. Typical problems are efficient use of scarce frequency resources, backward compatibility regarding different standards, and minimizing the number of repeaters.

SUMMARY OF INVENTION

In view of the above, the object of the invention is to improve transmission of digital broadcast information, in particular of composite digital broadcast information to mobile devices.

According to the present invention, this object is achieved by a method of transmitting digital broadcast information from a main transmitter to at least one repeater. The method comprises the steps of generating a composite digital broadcast signal carrying first digital broadcast information according to a first digital broadcast standard or specification. Further, the digital broadcast signal carries also second digital broadcast information according to a second digital broadcast standard or specification. The composite digital broadcast signal is then broadcast to the at least one repeater such that the second digital broadcast information is sent in a transmission mode used for usual transmission of the first digital broadcast information. In other words, according to the present invention, it is proposed to feed repeaters with the second digital broadcast information using a transmission mode initially set up for the first digital broadcast information.

An important advantage of setting up a composite signal according to a first digital broadcast standard and a second digital broadcast specification, e.g., according to DVB-T and DVB-H, is that, assuming that a specific transmission rate has initially been reserved for the first digital broadcast specification then this reserved transmission rate may be flexibly assigned and balanced for the first digital broadcast information and the second digital broadcast information.

Another important advantage of using a first transmission mode also for an additional second digital broadcast information is that this second digital broadcast information may then be transferred from the transmitter to the repeater without additional transmission overhead using the transmission mechanism provided according to the first digital broadcast specification alone.

Another advantage of transmitting broadcast information from a main transmitter to a repeater is that mobile devices may receive broadcasting information, both, from the main transmitter and also from repeaters. Here, mobile devices may decode either signal from the main transmitter or repeaters, whichever are of better quality at the location of the mobile device.

Further, the provision of repeaters adapted to handle composite digital broadcast signals enhances the coverage for either the first and/or the second digital broadcast specification.

According to a preferred embodiment of the present invention, the generation of the composite digital broadcast signal relies on time multiplexing of the first digital broadcast information and the second digital broadcast information onto a digital broadcast bit stream which is then encoded and modulated for setup of the composite digital broadcast signal.

Therefore, the time multiplexing allows for trading the available transmission rate between the first digital broadcast information and the second digital broadcast information, e.g., between DVB-T and DVB-H mode. Assuming that a specific transmission rate is assigned to the second digital broadcast specification, the remaining transmission rate may be used for the first digital broadcast specification.

In this way the capacity reduction for the first digital broadcast specification implied by the introduction of the second digital broadcast specification may be freely chosen instead of reducing the capacity for the first digital broadcast specification only in steps of a full capacity of a frequency carrier.

It should be noted that for specific digital broadcast information, e.g., TV channels, the related transmission rate may be reduced, e.g., by 1 Mpbs without perceivable quality reduction. This enables in-band distribution of the second digital broadcast information using the transmission mode for the first digital broadcast information, which may be a more compact mode.

According to a further preferred embodiment of the present invention it is proposed to generate the composite digital broadcast signal by using hierarchical modulation where the signal corresponding, e.g., to the second broadcast information, is overlaid or superimposed onto a transmission signal carrying the first digital broadcast information.

According to this aspect of the present invention the transmission capacity that remains for the first digital broadcast information after introduction of the second digital broadcast information is higher than with the time multiplexing approach.

Yet another important advantage of this preferred embodiment of the present invention is that mobile devices preinstalled in the field may still receive the first digital broadcast information irrespective on whether the second digital broadcast information is superimposed or not. In other words, the overlaying of the second digital broadcast information in this way will not cause problems to legacy receivers.

Still further, as the transmission power of the overlay signal for the second digital broadcast information may be freely adjusted in relation to the signal carrying the first digital broadcast information, the power ratio can be assigned for a trade-off between robustness of reception of the second broadcast information at the repeaters and robustness of the reception of the first broadcast information at mobile devices.

The object outlined above is also achieved by a method and related apparatus of operating a repeater for distributing of digital broadcast information. According to the present invention, it is proposed that the repeater receives a composite digital broadcast signal carrying the first digital broadcast information according to a first digital broadcast specification or standard, e.g., DVB-T, and a second digital broadcast information according to a second digital broadcast specification or standard, e.g., DVB-H.

As first option the repeater may forward the composite digital broadcast signal directly.

The benefit of forwarding the composite digital broadcast signal, as it is, is the improvement of coverage for, both, the first digital broadcast specification and the second digital broadcast specification.

As second option there may be derived a digital repeater forwarding signal reflecting the first digital broadcast information or the second digital broadcast information from the composite digital broadcast signal.

The benefit of creating a digital repeater forwarding signal carrying either the first digital broadcast information or the second digital broadcast information is that a specific suitable transmission mode may be used for forwarding of related information between the repeater and a mobile device which is better suited to the wireless reception conditions of the mobile device.

According to further preferred embodiments of the present invention such conditioning for transmission between the repeater and the mobile device could be, e.g., re-arranging digital bit streams along a time axis for modification of transmission rate which would allow higher power savings at the receiver terminal. Also, a further reason for rearranging the digital bit stream along the time axis is that information belonging to the same user information data stream is merged into longer bursts.

In addition, one could apply forward error coding before channel coding to increase stability of transmission or further protocol encapsulation, e.g., MPE multi protocol encapsulation used in DVB-H for IP datagrams over MPEG 2 transport streams.

Further to the above, further preferred embodiments of the present invention are derived through combination of the principles outlined so far, such that the main transmitter, in addition to the transmission signal feeding the repeaters also broadcast the same transmission signal as the repeaters either on a same or a different frequency as used for the forwarding by the repeaters.

Here, the advantage is that when using the same frequency for broadcasting from the main transmitter and from the repeaters the receiving terminals have combined coverage of, both, main transmitters and repeaters.

Further, in areas where the main transmitter may provide coverage, no repeaters are necessary at all.

Still further, receiving mobile devices may actually accumulate the signal power received from main transmitter and repeaters, which is of particular benefit in graphical areas where signal powers from main transmitter and repeaters are rather low and of similar magnitude.

According to another preferred embodiment of the present invention there is provided a computer program product directly loadable into the internal memory of a digital broadcast information transmission unit or a digital broadcast information repeater unit comprising software code portions for performing the inventive broadcasting transmission and broadcasting repeating process when the product is run on a processor of the digital broadcast information transmission unit or the digital broadcast information repeater unit.

Therefore, the present invention is also provided to achieve an implementation of the inventive method steps on computer or processor systems. In conclusion, such implementation leads to the provision of computer program products for use with a computer system or more specifically a processor comprised in e.g., a digital broadcast information transmission unit or a digital broadcast information repeater unit.

This programs defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and harddrives; or information convey to a computer/processor through communication media such as network and/or Internet and/or telephone networks via modems or other interface devices. It should be understood that such media, when carrying processor readable instructions implementing the inventive concept represent alternate embodiments of the present invention.

DESCRIPTION OF DRAWING

In the following the best mode and preferred embodiments of the present invention will be explained with reference to the drawing in which.

DESCRIPTION OF BEST MODE AND PREFERRED EMBODIMENTS

In the following the present invention will be described with respect what is considered as best mode and preferred embodiments thereof. While in the following the different principles underlying the present invention will be explained with respect to two different digital broadcast information specifications also referred to a standards, it should be clear, that basically the same principles may be applied to more than two different digital broadcast information specifications.

Also, while in the following as example for digital broadcasting information specification reference is made to the DVB-T, Digital Video Broadcast-Terrestrial, and the DVB-H, Digital Video Broadcasting-Handheld, broadcasting standard, it should be clear that any such reference may not be construed limiting the scope of the present invention as outlined by the appended claims.

Still further, insofar as different functionality of the present invention is explained, it should be clear that any such functionality may be implemented either in software or hardware and/or a combination thereof.

Figure 1:
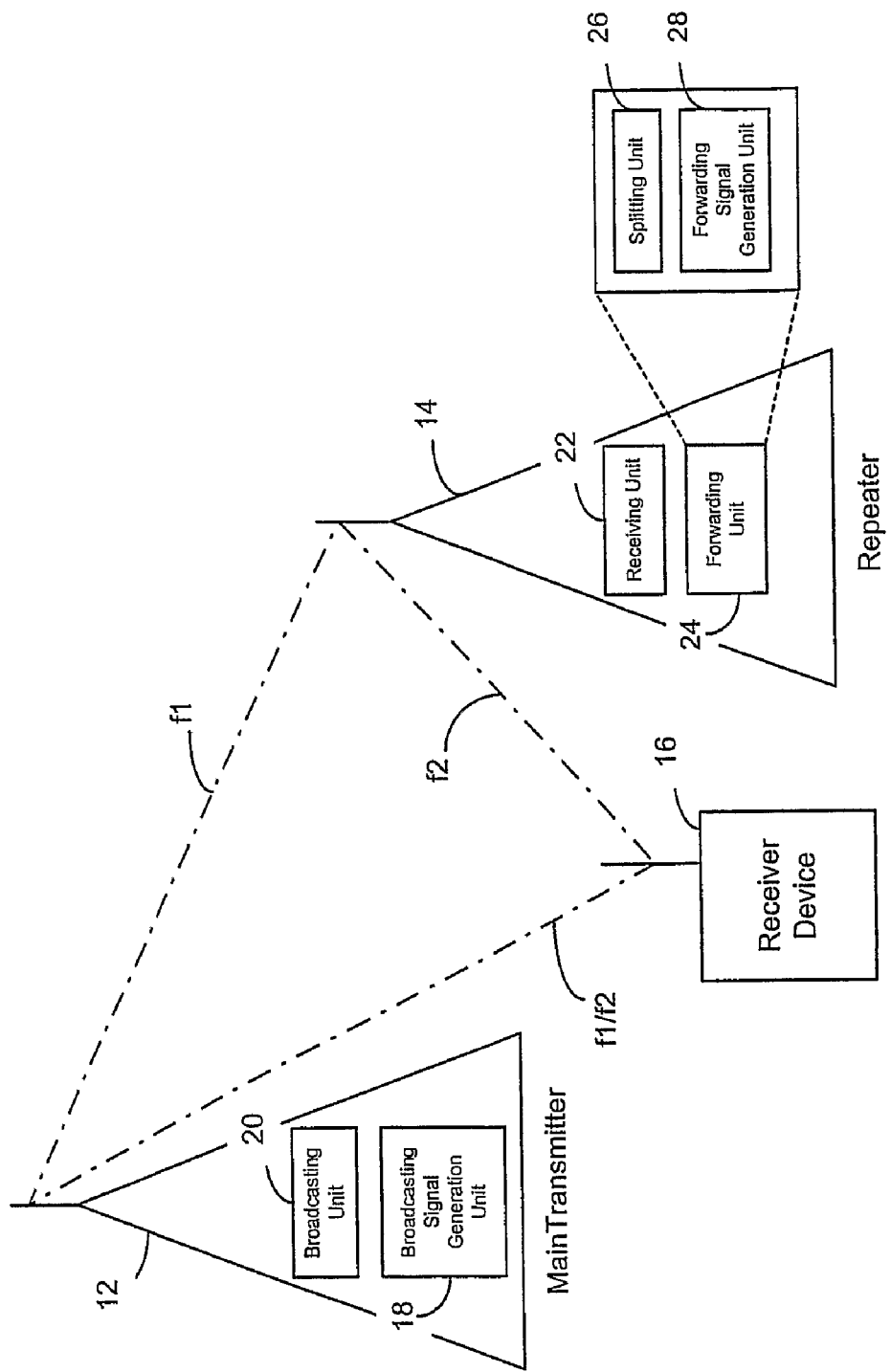
FIG. 1 shows a schematic diagram illustrating the principles underlying the present invention.

FIG. 1 shows a schematic diagram outlining the principles underlying the present invention.

As shown in FIG. 1, the digital broadcasting system 10 according to the present invention comprises at least one main transmitter 12 and at least one repeater 14. Further, in the digital broadcasting system 10 there is operated a receiver device 16 which may receive signals at least from the repeater 14 and optionally also from the main transmitter 12.

It should be noted that for the present invention there exists no restriction on the type of transmission use between the main transmitter, the repeater and the receiver device which may be wireline or wireless, and/or packet-switched or any combination thereof.

As shown in FIG. 1, the main transmitter 12 comprises a broadcast signal generation unit 18 and a broadcasting unit 20.

Operatively, the broadcast signal generation unit 18 is adapted to generate a composite digital broadcast signal carrying a first digital broadcast information according to a first digital broadcasting standard, e.g., DVB-T, and a second digital broadcast information according to second digital broadcast standard, e.g., DVB-H.

Operatively, the broadcasting unit 20 is adapted to broadcast the composite digital signal such that the second digital broadcast information is sent in a transmission mode used for transmission of the first digital broadcast information.

In other words, according to the present invention the main transmitter is adapted to set up a composite digital broadcast signal carrying two parts of broadcast information, while using the transmission in a mode according to one digital broadcast standard, e.g., DVB-T. This is beneficial in that the overhead in processing and transmitting the composite digital broadcast signal at the main transmitter side is minimized.

As shown in FIG. 1, the repeater 14 comprises a receiving unit 22 adapted to receive the composite digital broadcast signal forwarded by the main transmitter 12 and a forwarding unit 24 adapted to forward digital broadcast information to the receiver device 16.

Operatively, the receiver unit 22 is adapted to receive the composite digital broadcasting signal carrying the first digital broadcast information according to the first digital broadcast standard, e.g., DVB-T, and the second digital broadcast information according to the second digital broadcast standard, e.g., DVB-H.

Further, operatively the forwarding unit 24 is adapted to forward either the composite digital broadcast signal or as second alternative a digital repeater forwarding signal carrying only the first digital broadcast information or only the second digital broadcast information.

As shown in FIG. 1, the forwarding unit 24 comprises a splitting unit 26 and a forwarding signal generation unit 28 adapted to determine the digital repeater forwarding signal carrying either the first digital broadcast information or the second digital broadcast information.

Operatively, the splitting unit 26 is adapted to determine a forwarding part from the composite digital broadcast signal, e.g., according to DVB-H standard. The forwarding part reflects either the first digital broadcast information or the second digital broadcast information.

Further, operatively the forwarding signal generation unit 28 is adapted to deduct a non-forwarding part, e.g., a part being related to DVB-T, from the composite digital broadcast signal. Therefore, what remains after deduction is the actual part of the composite digital broadcasting signal which is to be forwarded by the repeater.

A further aspect according to the present invention relates to frequencies used for operation between the main transmitter 12 and the repeater 14 and the communication between the main transmitter 12 and the receiver device 16 or for communication between the repeater 14 and the receiver device 16.

As shown in FIG. 1, according to a first option one may use a different frequency/frequency band for communication between the main transmitter and the repeater and for communication between the repeater and the receiver device.

Further, the receiver device 16 may also receive broadcast information directly from the main transmitter 12 either using the frequency also used for communication between the main transmitter 12 and the repeater 14 or according to the frequency used for communication between the repeater 14 and the receiver device 16.

When the frequency specification for communication between the repeater 14 and the receiver device 16 differs from the frequency specification used for communication between main transmitter 12 and the receiver device 16, the receiver device should be able to receive both frequencies.

Therefore, according to one aspect of the present invention the main transmitter not only feeds the repeaters but also broadcasts directly to the receiver device 16 either using the same frequency as used for broadcasting to the repeater 14 or using a different frequency. The latter approach allows the receiver device 16 to have a combined coverage from the main transmitter 12 and the repeater 14.

In the following preferred embodiments of the main transmitter 12 according to the present invention will be explained with reference to FIGS. 2 to 6.

Figure 2:
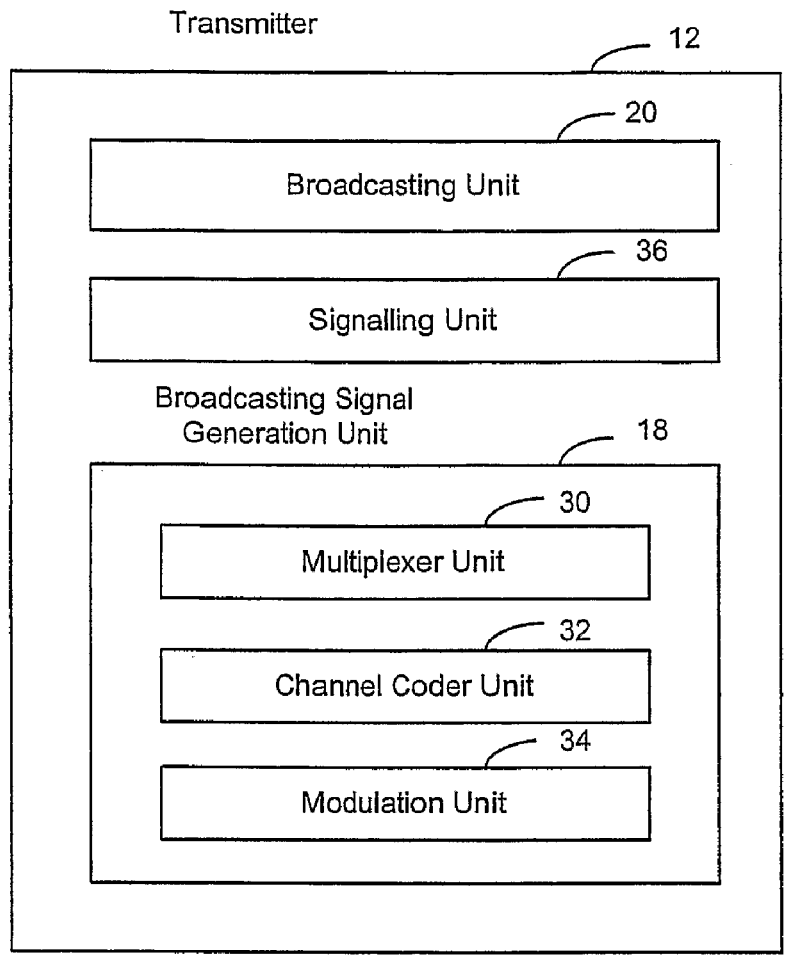
FIG. 2 shows a schematic diagram of a main transmitter according to a first embodiment of the present invention.
Figure 3:
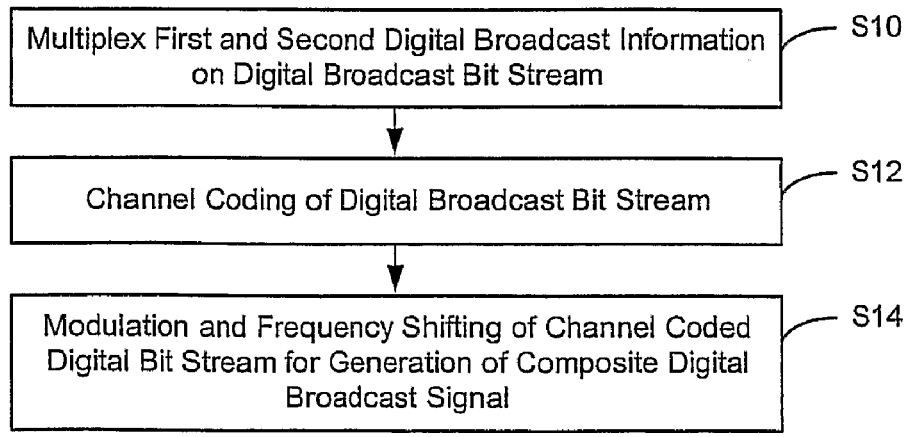
FIG. 3 shows a flowchart of operation of the main transmitter shown in FIG. 2.
Figure 4:
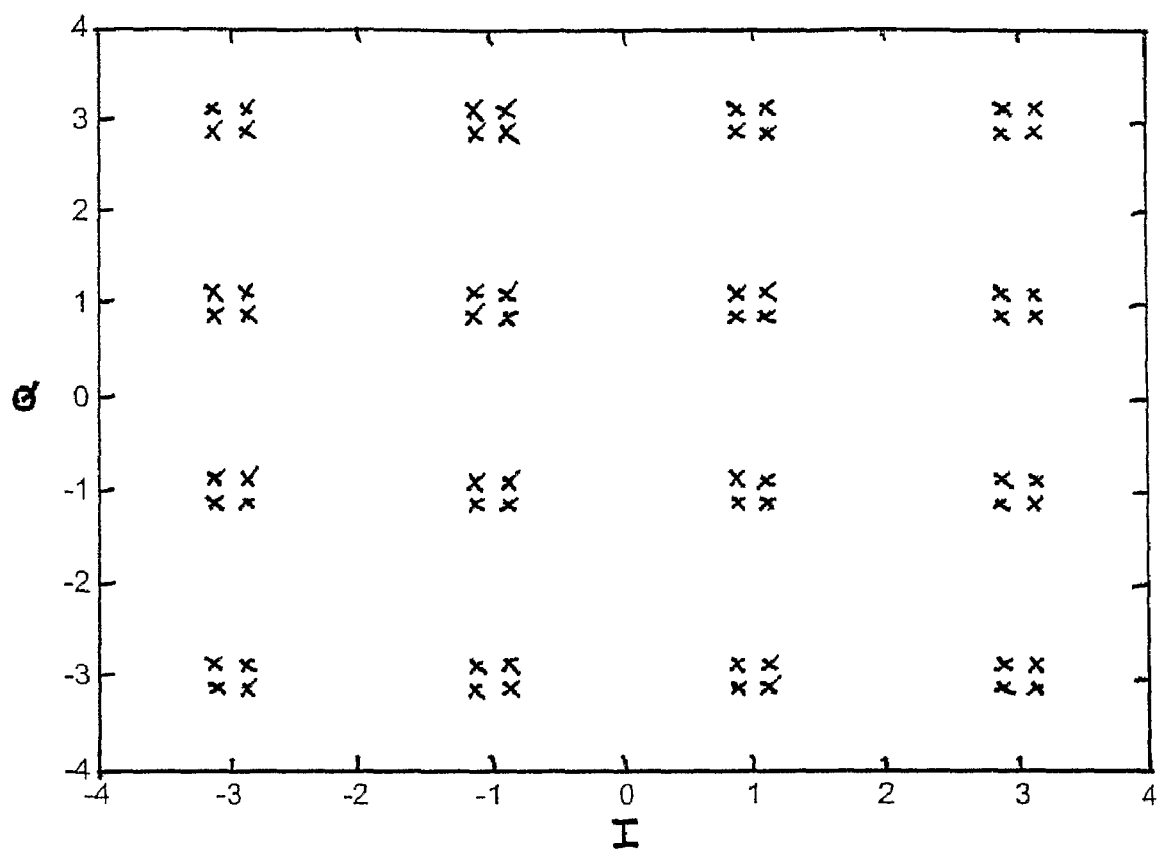
FIG. 4 shows a schematic diagram of a main transmitter according to a second embodiment of the present invention.
Figure 5:
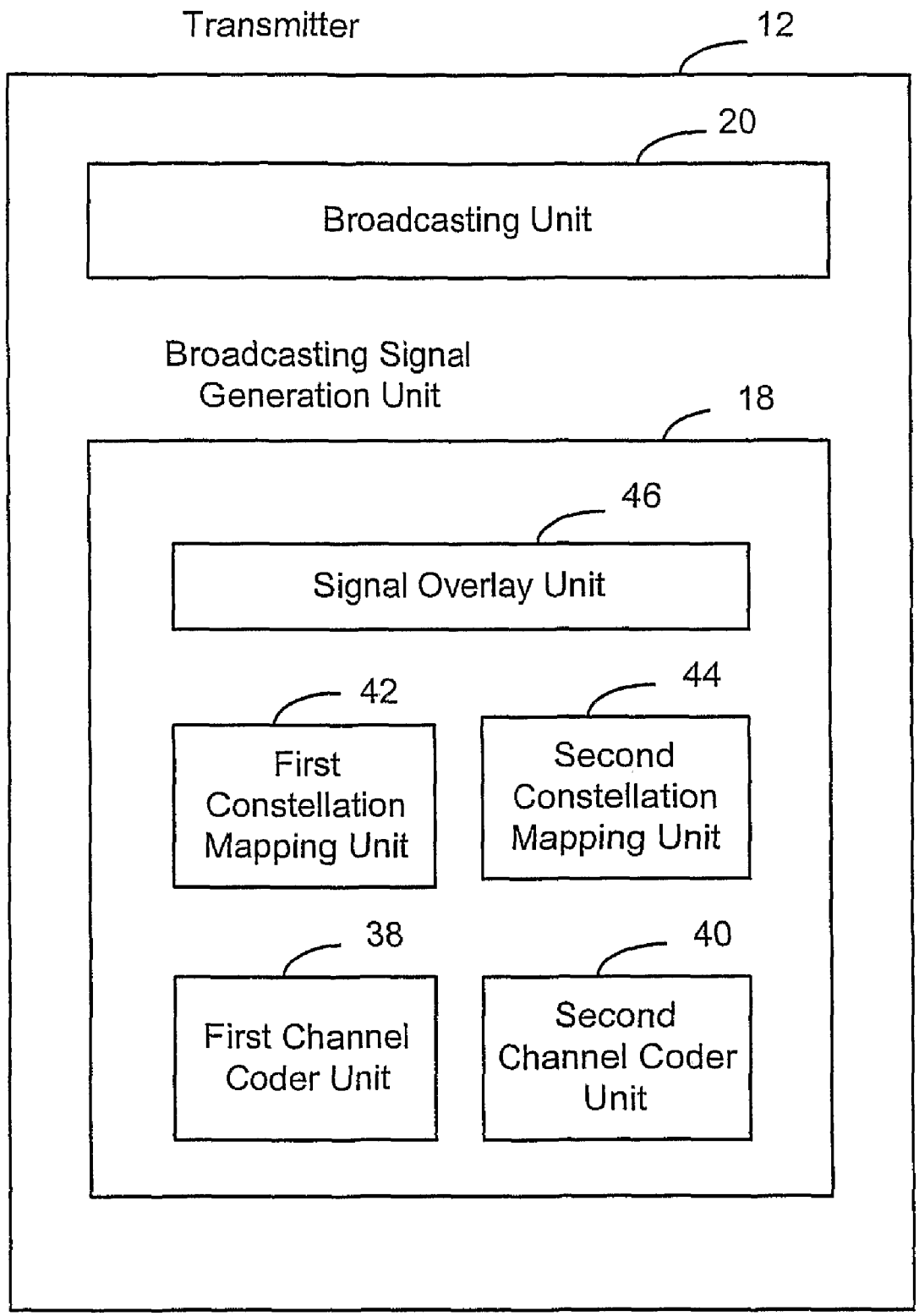
FIG. 5 shows a flowchart of operation for the main transmitter shown in FIG. 4.
Figure 6:
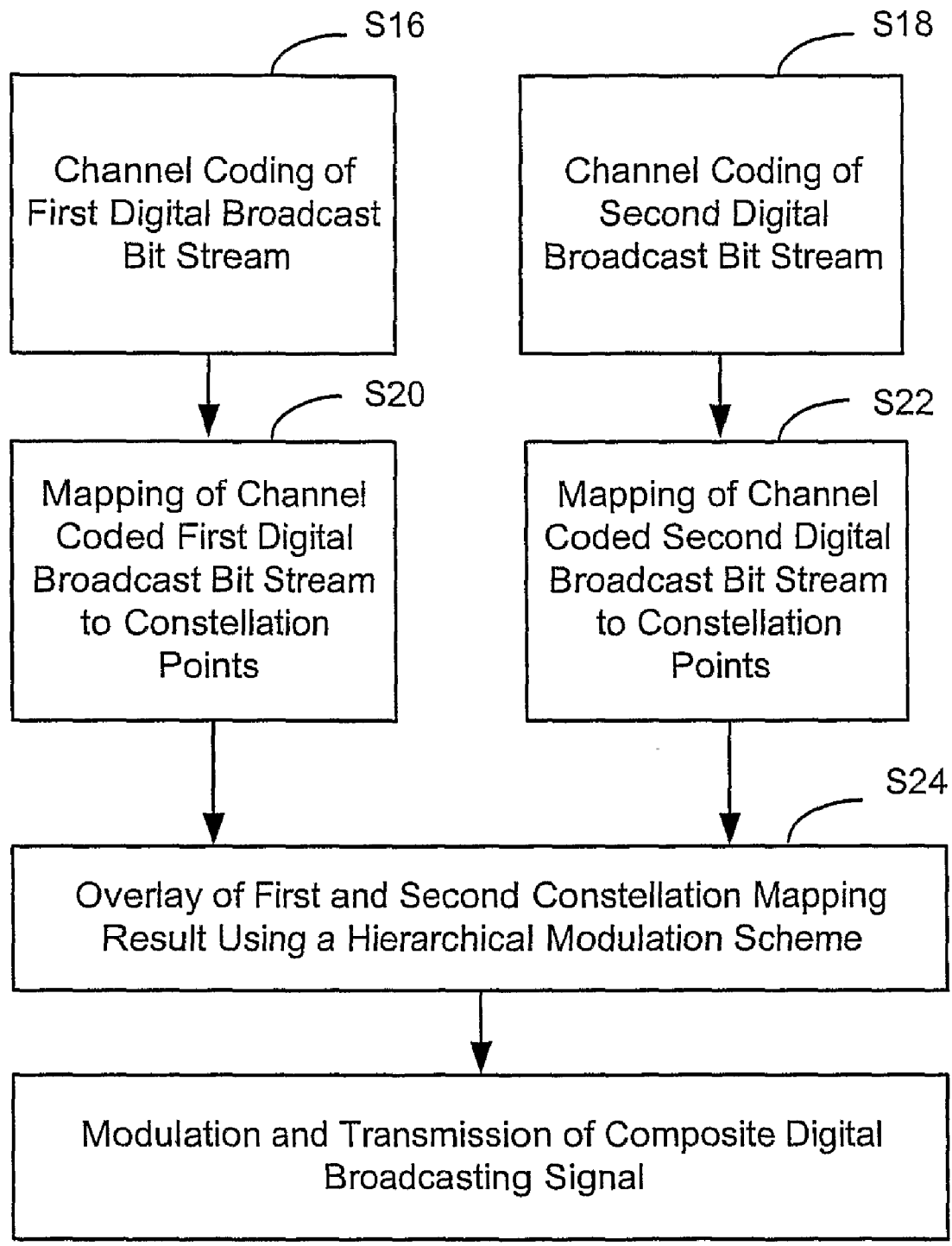
FIG. 6 shows a constellation diagram for hierarchical modulation according to the present invention.

FIGS. 2 and 5 show schematic diagrams of preferred embodiments of the main transmitter 12, FIGS. 3 and 6 show flow chart of operation of the respective embodiments and FIG. 4 shows a constellation diagram for hierarchical modulation according to the present invention.

As shown in FIG. 2, a main transmitter 12 according to a preferred embodiment of the present invention comprises the broadcasting signal generation unit 18 and the broadcasting unit 20. The broadcasting signal generation unit 18, comprises a multiplexing unit 30, a channel coder unit 32, and a modulation unit 34. Optionally, the main transmitter 12 may comprise a signalling unit 36 for forwarding multiplex-related information to repeaters 14, as will be explained in more detail in the following.

FIG. 3 shows a flowchart of operation of the main transmitter 12 shown in FIG. 2.

Operatively, in a step S10 the multiplexing unit 30 executes time multiplexing of the first digital broadcast information and the second digital broadcast information onto a digital broadcast bit stream. The multiplexing unit 30 may divide the transmission data normally available for transmission of the first digital broadcast information for multiplex transmission of the first digital broadcast information and the second digital broadcast information, e.g., according to a predetermined multiplexing scheme or according to application specific requirements.

As shown in FIG. 3, in a step S12 the channel coding unit 32 executes a channel coding for the digital broadcast bit stream output by the multiplexing unit 30.

As shown in FIG. 3, in a step S14 the modulation frequency shifting unit 34 executes a modulation and frequency shifting of the channel coded digital broadcast bit stream for generation of a base band signal shifted to a carrier frequency of the main transmitter 12.

Further, operatively the signalling unit 36 of the main transmitter 12 may be used for forwarding and signalling a multiplexing scheme used for time multiplexing of the first digital broadcast information and the second digital broadcast information at the main transmitter. The forwarding is executed towards the repeater 14 processing the composite digital broadcast signal.

The signalling of the time multiplexing scheme allows to continuously adapt the time multiplexing scheme according to varying specifications. Further, it enables to always have the appropriate multiplexing information available at the repeater 14 processing the composite digital broadcast signal.

In the following a further aspect of the present invention being related to the operation of the main transmitter will be explained. This aspect is related to application of a hierarchical modulation scheme for generation of the composite digital broadcast signal instead of applying the time multiplexing approach outlined above.

Hierarchical modulation is previously known from, e.g., ETSI-N 300 744 digital video broadcasting DVB; framing structure, channel coding and modulation for digital terrestrial television; V 1.4.1; 2001. The hierarchical modulation scheme described in this document has the problem that some receiver devices 16 in the market may have problems in determining which modulation layer of the hierarchical modulation scheme they should decode and use for further processing. Further, transmission power of the different data streams cannot be defined independently of each other.

These problems are overcome with the hierarchical constellation diagram of the present invention as shown in FIG. 4.

The constellation diagram shown in FIG. 4 is hierarchical in that a plurality of clusters of constellation points are arranged in the constellation plane in a regular manner. Each cluster in itself defines a first level of abstraction. The second level of abstraction is achieved through spreading of the different constellation point clusters over the constellation plane.

As shown in FIG. 4, one may consider the information carried by, e.g., the right most cluster in the first row as being related to the values I=3 and Q=−3 on a first level of abstraction. On a second level of abstraction the information may be considered as the relative position of each constellation point in the cluster with respect to the point I=3 and Q=−3, etc.

As shown in FIG. 4, one may consider the provision of the clusters as an overlay signal used for the second digital broadcast information while the first digital broadcast information is mapped to an arrangement of the different clusters in the constellation plane. Therefore, the overlay does not cause significant interference to the first digital broadcast information signal.

Further, according to the present invention the signal power of the overlay is determined smaller than the signal power of the underlying signal for the first digital broadcast information. Still, the repeater 14 can decode the overlay signal with a target quality as the radio link quality from the main transmitter 12 to the repeater 14 is generally much better than the quality of the radio link from the main transmitter 12 to the receiver device 16. The receiving antenna of the repeater 14 may be mounted at an elevated position, in line of sight with the main transmitter 12. Further, the repeater 14 may use a directional antenna to significantly reduce interference.

Further, the overlay signal may use a more robust transmission scheme than the overlay signal. E.g., the first digital broadcast information could be transferred using 16 QAM with a code rate 2/3, and the overlay signal according to the second digital broadcast information could use a QPSK with a code rate 2/3.

FIG. 4 shows an example of a composite signal constellation in the I/Q plane for power ratio of 25 dB between the 16 QAM signal carrying the first digital broadcast information and the QPSK signal carrying the second digital broadcast information. In this case, the interference of the overlay signal according to QPSK to the signal according to 16 QAM would require a 1 dB larger signal to noise ratio of the 16 QAM signal to maintain requirements for the transmission of the first digital broadcast information for a so-called quasi error free reception.

E.g., with a QPSK signal using a code rate 2/3 for the overlay, a signal to noise ratio of 5.7 dB would be required for a Rice channel, see ETSI EN 300 744 Digital Video Broadcasting (DVB), Framing structure, channel coding and modulation for digital terrestrial television; V1.4.1; 2001. Therefore, the link budget for the overlay signal would be 25 dB−5.7 dB=19.3 dB smaller than for the main signal carrying the first digital broadcast information. It may be expected that the smaller link budget is compensated by the repeater reception antenna gain and the line of sight propagation from the main transmitter 12 to the repeater 14.

Further, to the above it should be noted that the overlay signal can be a standard conform signal according to QPSK, 16 QAM, or 64 QAM, i.e., all non-hierarchical modulated, in which case the repeater 14 may simply transmit this signal on a new frequency after it has been separated from the composite digital broadcast signal.

Alternatively, the overlay signal may use any signal structure that is not conforming to a standard for transforming the second digital broadcast information, e.g., a DVB-H physical layer standard. In this case, the repeater needs to create a new signal according to the physical layer transmission standard from the received overlay signal after separation from the composite digital broadcast signal.

Further, according to the present invention the signal power of the overlay signal may be increased when the signal carrying the first digital broadcast information is changed to a more robust variant, however, at the cost of reducing the data rate of this signal.

FIG. 5 shows a schematic diagram of a main transmitter 12 according to an embodiment of the present invention using hierarchical modulation in the sense outlined above.

As shown in FIG. 5, the main transmitter 12 comprises the broadcasting signal generating unit 18 and the broadcasting unit 20. The second embodiment differs over the previous embodiment in the structure of the broadcasting signal generation unit 18.

As shown in FIG. 5, the broadcasting signal generation unit 18 comprises a first channel coder unit 38, a second channel coder unit 40, a first constellation mapping unit 42, a second constellation mapping unit 44, and a signal overlay unit 46.

FIG. 6 shows a flowchart of operation for the main transmitter 12 shown in FIG. 5.

As shown in FIG. 6, in a step S16 the first channel coder unit 38 executes a channel coding of the first digital broadcast bit stream. Further, in a step S18 the second channel coder unit 40 executes a second channel coding of the second digital broadcasting bit stream. In a step S20 the first constellation mapping unit 42 executes a mapping of the first channel coded broadcast bit stream to related constellation points. In a step S22 the second constellation mapping unit 44 executes a mapping of the second channel coded broadcast bit stream to related constellation points.

Here, in view of FIG. 4 the outcome of the step S20 may be understood as vectors pointing from the origin of the constellation plane to the centre of the different clusters. The outcome of the step S22 may be considered as vectors pointing to one of the constellation points in each cluster.

It should be understood that after constellation point mapping of the first and second channel coded digital broadcast bit stream in a step S24 the signal overlay unit 46 executes an overlay of the first and second mapping result using the hierarchical modulation scheme outlined above. Also, the broadcasting unit 20 will achieve a shifting of the overlay result to a carrier frequency used at the main transmitter 12. The adjustment of the signal power for the second digital broadcast information in relation to the signal power of the first digital broadcast information is achieved by the broadcasting unit 20.

As alternative embodiment of the present invention the process of overlay and modulation may be reversed. Here, each mapped channel coded first and second digital broadcast bit stream is modulated before subsequent overlay.

Assuming overlay followed by modulation, the first digital broadcast information is constellation mapped through mapping of the first channel coded broadcast bit stream onto one constellation point of a plurality of constellation points in a first constellation diagram of a first level of hierarchy. Also, the second digital broadcast information is constellation mapped through mapping of the second channel coded broadcast bits stream onto a second constellation point of a plurality of constellation points in a second constellation diagram according to a second level of hierarchy. The composite mapping result is generated by vector overlay of the first constellation point and the second constellation point.

While above different embodiments of the main transmitter 12 according to the present invention have been described, in the following the operation of the repeater 14 and related embodiments will be described with reference to FIGS. 7 to 10.

It should be noted that the operation of the repeater 14 may be divided in four categories depending on whether the main transmitter uses multiplexing or hierarchical modulation and depending on whether the repeater 14 only forwards the received composite digital broadcast signal or processes this composite digital broadcast signal for generation of a digital repeater forwarding signal.

A first class of operation is related to direct forwarding of a composite digital broadcast signal being generated by time multiplexing. Here, direct forwarding is achieved using either the same repeater transmitter frequency that is also used by the main transmitter or by converting the carrier frequency from the carrier frequency used at the main transmitter 12 to a predetermined carrier frequency for the operation of the repeater 14.

A second class of operation is related to the processing of the composite digital broadcast signal at the repeater 14. Heretofore, operatively a splitting unit 26 is adapted to determine a forwarding part from the composite digital broadcast signal reflecting a first digital broadcast information or a second digital broadcast information. Further, forwarding signal generation unit 28 is adapted to deduct a non-forwarding part from the composite digital broadcast signal and to generate the repeated digital forwarding signal.

Figure 7:
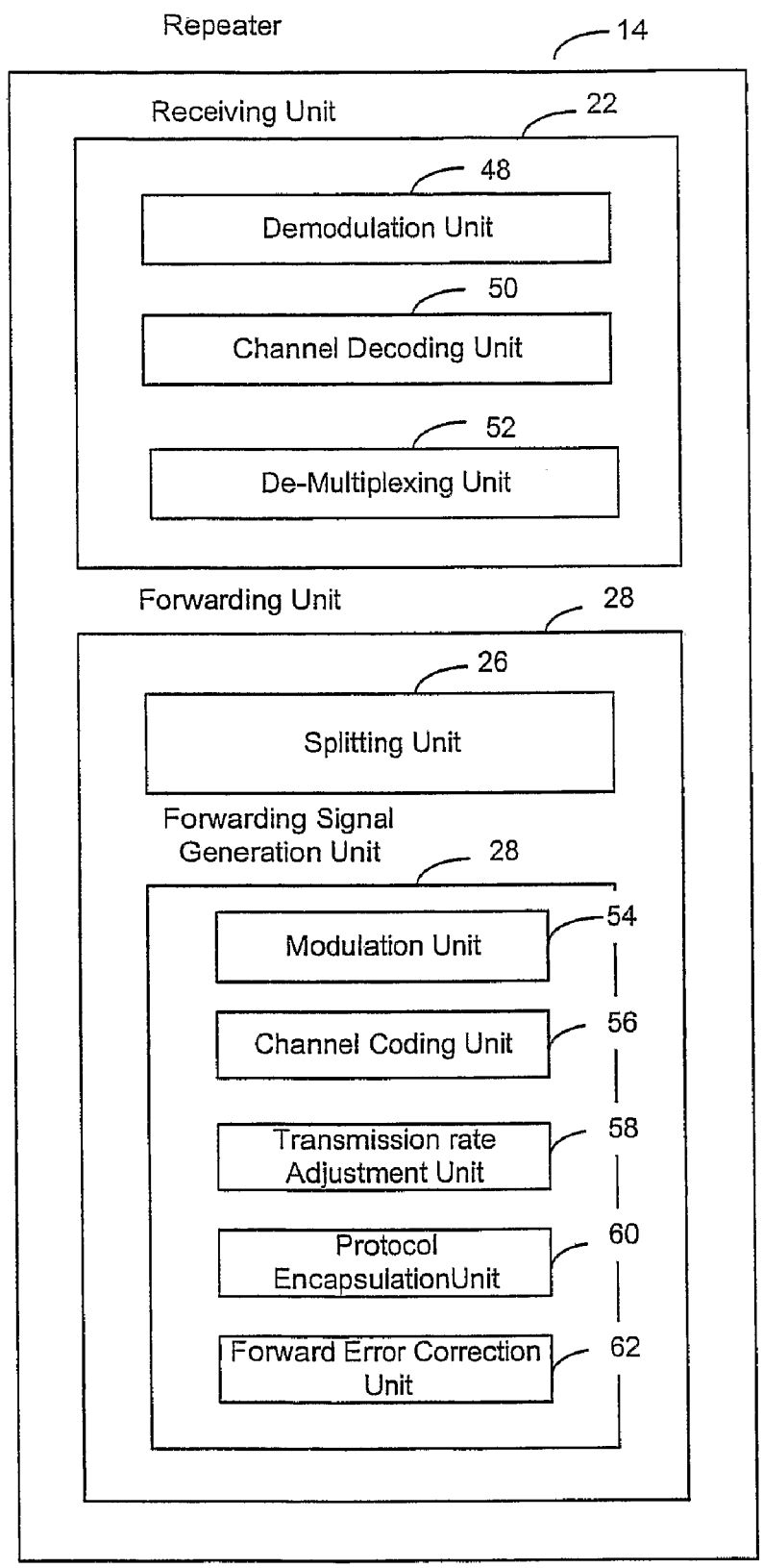
FIG. 7 shows a schematic diagram of a repeater according to a third embodiment of the present invention.

FIG. 7 shows a schematic diagram of a repeater 14 adapted to handle a time multiplexed composite digital broadcast signal and to generate a new repeater forwarding signal there from.

As shown in FIG. 7, the reception unit 22 of the repeater 14 comprises a demodulation unit 48, a channel decoder unit 50, and a de-multiplexing unit 52.

As shown in FIG. 7, the forwarding generation unit 28 comprises, a modulation unit 54, a channel coding unit 56, transmission rate adjusting unit 58, a protocol encapsulation unit 60, and a forward error correction unit 60.

Figure 8:
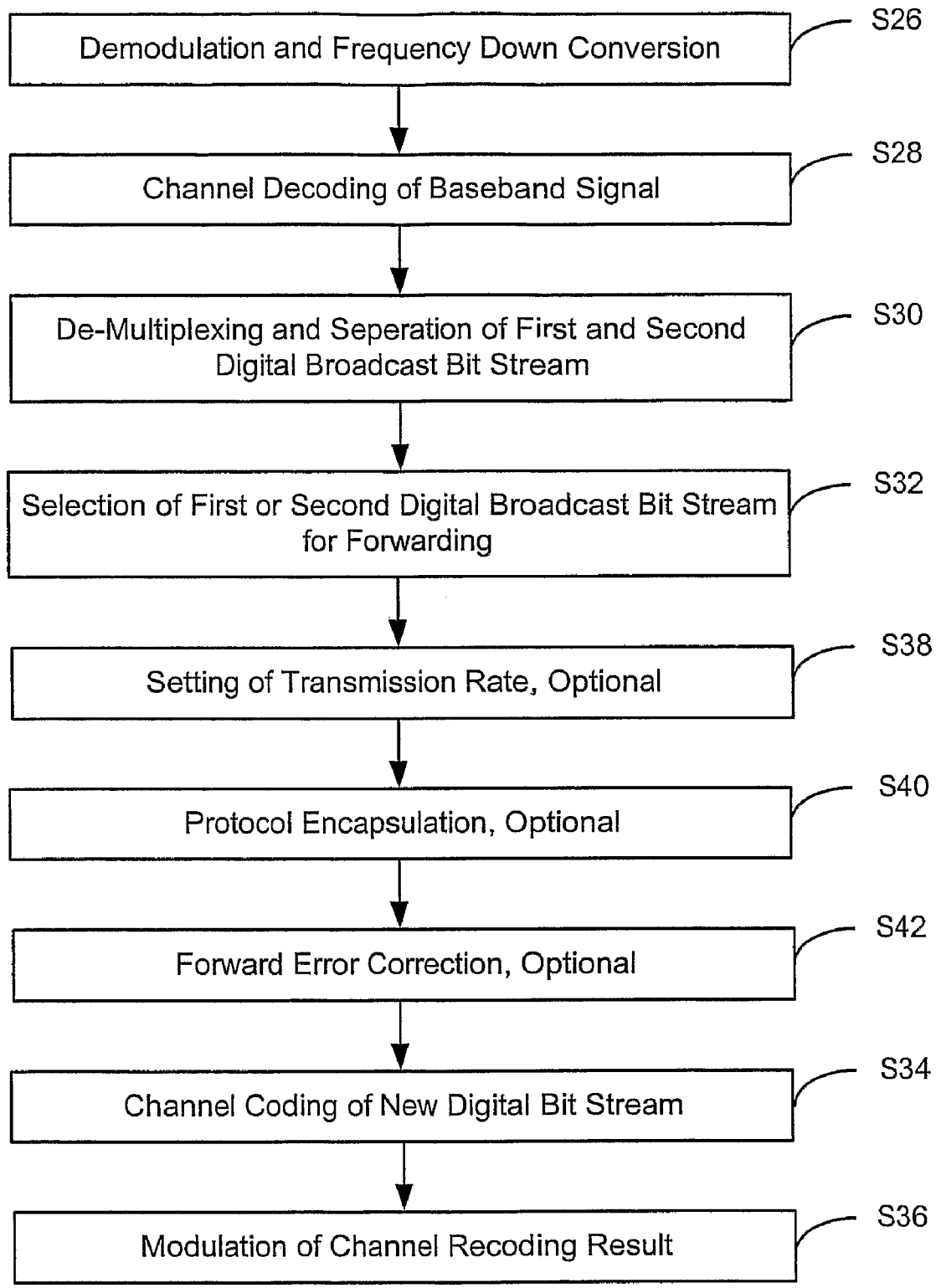
FIG. 8 shows a flowchart of operation for the repeater shown in FIG. 7.

FIG. 8 shows a flowchart of operation for the repeater 14 shown in FIG. 7.

As shown in FIG. 8, in a step S26 the demodulation unit 48 executes a frequency down conversion of the received composite digital broadcast signal and a demodulation for generation of a base band signal.

As shown in FIG. 8, in a step S28 the channel decoding unit 50 executes a channel decoding of the base band signal. Then, in a step S30 the de-multiplexing unit 52 executes a de-multiplexing of the first or the second digital broadcast bit stream for forwarding to the splitting unit 26.

As shown in FIG. 8, in a step S32 the splitting unit 26 executes a selection of either the first or the second digital broadcast bit stream as basis of operation for the forwarding signal generation unit 28 and as basis for determination of the repeater forwarding signal.

Assuming that the repeater 14 generates a new signal according to a different physical layer mode, e.g., QPSK, ½ rate, 4K mode for DVB-H, the forwarding signal generation unit 28 should be at least adapted to execute a channel coding.

As shown in FIG. 8, in a step S34 the channel coding unit 56 executes a channel coding of the digital repeater bit stream output by the splitting unit 26. The channel coding unit 56 uses a repeater channel coding scheme for generation of a channel coded digital repeater forwarding bit stream.

As shown in FIG. 8, in a step S36 the modulation unit 54 executes a modulation of the channel coded digital repeater bit stream. In the step S36 the modulation unit 54 also executes a frequency shifting to a predetermined repeater forwarding carrier frequency for generation of the digital repeater forwarding signal before transmission thereof to the receiving device 16.

Further, the transmission rate adjusting unit 58, the protocol encapsulation unit 60, and the forward error correction unit 62 shown in FIG. 7 may be operated as an option in the repeater 14.

As shown in FIG. 8, in a step 38 the transmission rate adjustment unit 58 executes a re-arrangement of digital repeater bit stream information along a time axis for modification of a transmission rate. Also, a further reason for re-arranging the digital bit stream along the time axis is that information belonging to the same user information data stream is merged into longer bursts.

As shown in FIG. 8, in a step S40 the protocol encapsulation unit 60 identifies broadcast datagrams in a digital repeater bit stream and applies a protocol encapsulation to the identified broadcast datagrams before general coding. An example for such encapsulation is MPE multitype protocol encapsulation used in DVB-H for sending IP datagrams over a MPEG2 transport stream.

As shown in FIG. 8, in a step S42 the forward error correction unit 62 executes an additional forward error coding of the digital repeated bit stream before channel coding thereof.

While above the operation of the repeater 14 has been explained with respect to a digital broadcasting signal set-up from time multiplexing of different broadcasting information, in the following the operation of the repeater 14 will be explained with respect to overlay modulation of the composite digital broadcast signal.

Figure 9:
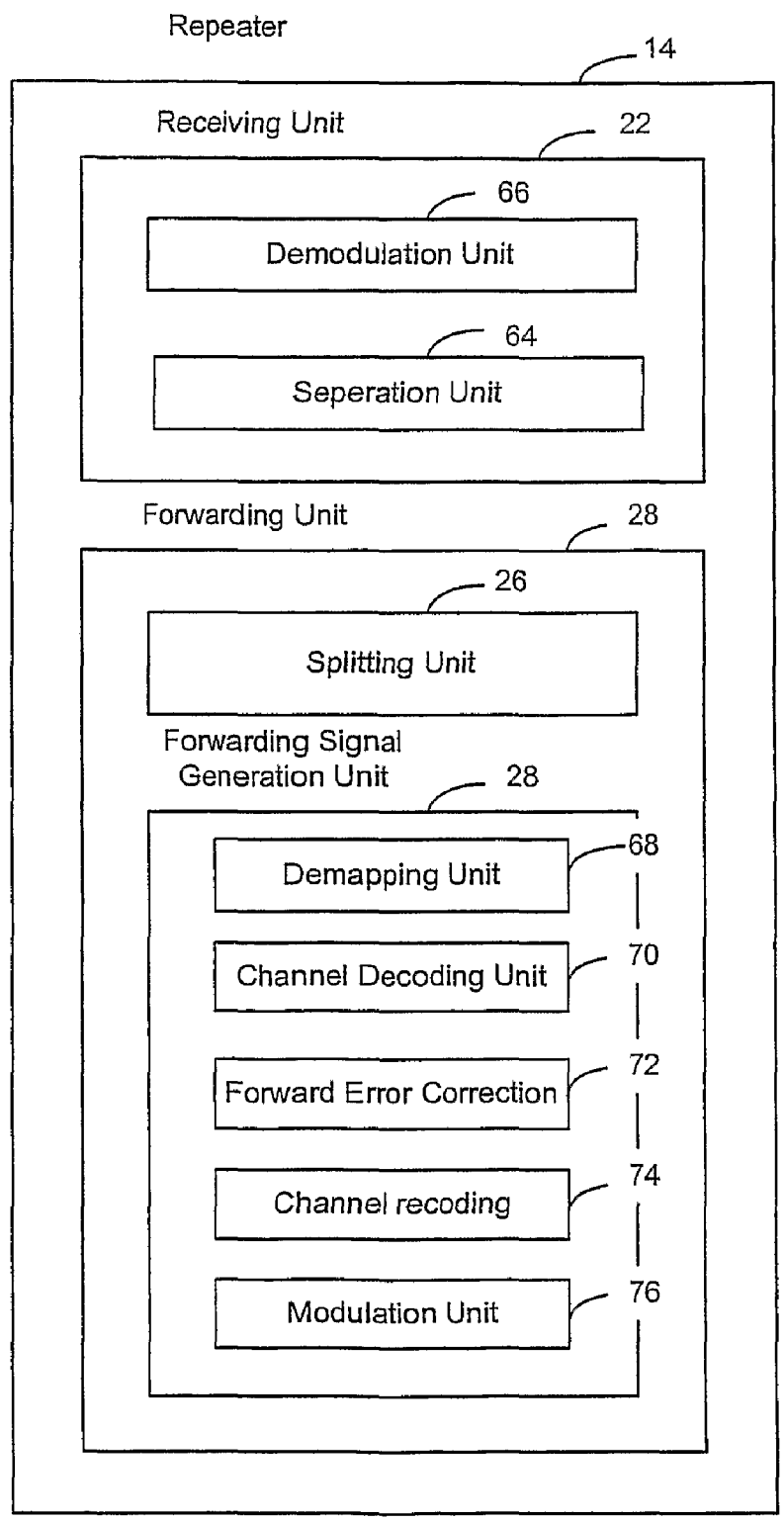
FIG. 9 shows a schematic diagram of a repeater according to a fourth embodiment of the present invention.

FIG. 9 shows a schematic diagram of an embodiment of the repeater 14 adapted to processing of overlay modulated digital protocol signals.

As shown in FIG. 9, the repeater 14 comprises receiving unit 22 having a demodulation unit 66 and a separation unit 64. Further, the repeater 14 comprises a forwarding signal generation unit 28 with a de-mapping unit 68, a channel decoding unit 70, a forward error correction unit 72, a channel re-coding unit 74, and a modulation unit 76. The elements of the forwarding signal generating unit 28 are operated to change the physical layer mode of the digital repeater forwarding signal.

Figure 10:
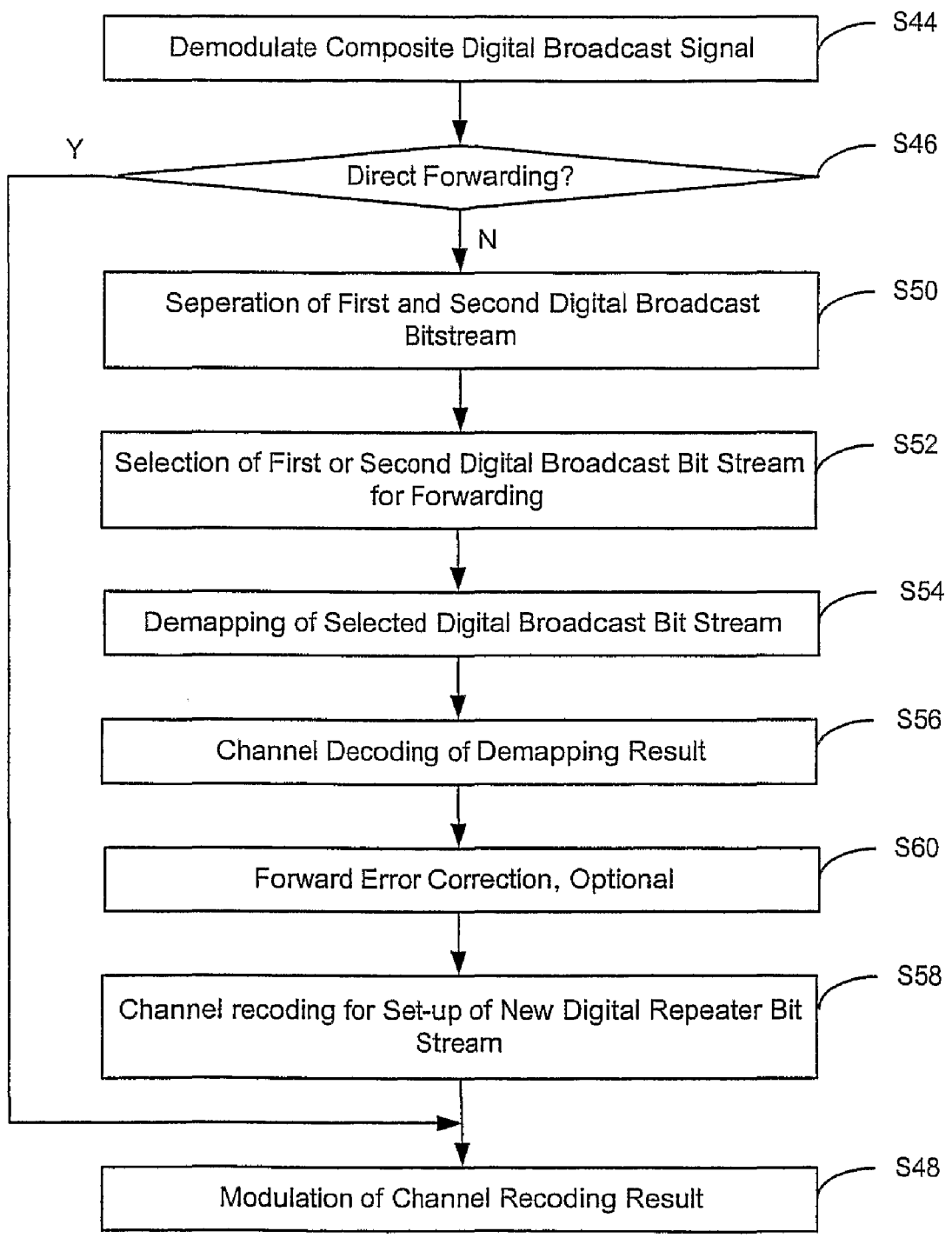
FIG. 10 shows a flowchart of operation for the repeater shown in FIG. 9.

FIG. 10 shows a flowchart of operation for the repeater 14 shown in FIG. 9.

As shown in FIG. 10, in a step S44 the demodulation unit 66 executes a frequency shifting and demodulation of the composite digital broadcast signal for generation of a first repeater base band signal.

As shown in FIG. 10, in a step S46 a controller of the forwarding unit 24 (not shown in FIG. 9) executes an interrogation to determine whether the selected digital broadcast bit stream is to be directly forwarded by the repeater 14 or whether a new digital repeater forwarding signal is to be set-up for adaptation to a new physical layer mode as basis for a transmission between the repeater 14 and the receiving device 16.

As shown in FIG. 10, assuming a positive interrogation in step S46 and thus direct forwarding of the received composite digital broadcasting signal, in a step S48 forwarding unit 28 will execute modulation and frequency shifting of the related digital broadcast bit stream to a repeater forwarding carrier frequency and then execute transmission to the receiver device 16.

As shown in FIG. 10, assuming a set-up of a digital repeater forwarding signal as outcome of the interrogation in step S46, in a step S50 the separation unit 64 executes a separation of the first base band signal into a first constellation mapped broadcast bit stream reflecting the first digital broadcast information and a second constellation broadcast bit stream reflecting the second broadcast information by reversing a vector overlay step.

The reversing of the vector overlay is executed assuming that the first digital broadcast information is transmitted after mapping of the first channel coded broadcast bit stream onto a first constellation point of a plurality of constellation points in a first constellation diagram, as shown in FIG. 4.

Further, the reversing of the vector overlay is executed assuming that a second digital broadcast information is transmitted after mapping of the second channel coded broadcast bit stream to a second constellation point of a plurality of constellation points in a second constellation diagram, as shown in FIG. 4. A further assumption is that the base band signal at the transmitter side is generated by vector overlay of the first constellation point and the second constellation point.

As shown in FIG. 10, in a step S52 the splitting unit 26 executes a selecting of either the first constellation mapped broadcast bit stream or the second constellation mapped broadcast bit stream for set-up of the digital repeater forwarding signal.

As shown in FIG. 10, in a step S54 the demapping unit 68 executes a de-mapping of the separated first constellation mapped broadcast bit stream or second constellation mapped broadcast bit stream for generation of a de-mapped digital repeater bit stream. Then, in a step S56 the channel decoding unit 70 executes a channel decoding of the de-mapped repeater bit stream for generating a channel decoded digital repeater bit stream.

As shown in FIG. 10, in a step S58 the channel recoding unit 74 executes a channel recoding of the channel decoded digital repeater bit stream for generation of the second, i.e. new digital repeater bit stream. Optionally, in a step S60 the forward error correction unit 74 executes an additional forward error correction before channel recoding of the channel decoded repeater forwarding bit stream.

As shown in FIG. 10, in a step S48 the modulation unit 76 executes modulation and frequency conversion to a repeater carrier frequency of the channel recoding result for set-up of the digital repeater forwarding signal.

As outlined above, according to the present invention it is proposed to integrate the application of different digital broadcasting standards in an efficient manner for exchange of broadcast information between a main transmitter 12 and at least one repeater 14 and subsequent forwarding to at least one receiving unit. The main transmitter 12 may either apply to time multiplexing or overlay modulation.

Further, the repeater 14 may be operated in four categories of operation depending on application of time multiplexing or overlay modulation at the side of the main transmitter and depending on direct forwarding or reconfiguration of a repeater forwarding signal before data transmission from the repeater 14 to the receiver device 16.

The invention claimed is:

1. Method of operating a repeater for distribution of digital broadcast information, characterized by the steps:
receiving a composite digital broadcast signal carrying first digital broadcast information according to a first digital broadcast specification (DVB-T) and second digital broadcast information according to a second digital broadcast specification (DVB-H), wherein the signal corresponding to the second digital broadcast specification (DVB-H) is overlaid onto a transmission signal carrying the first digital broadcast information using hierarchical modulation; and
selectively forwarding either the composite digital broadcast signal or a digital repeater forwarding signal carrying the first digital broadcast information or the second digital broadcast information;
wherein the step of deriving the digital repeater forwarding signal comprises the steps:
determining a forwarding part (DVB-H) from the composite digital broadcast signal reflecting a first digital broadcast information or a second digital broadcast information; and
deducting a non-forwarding part (DVB-T) from the composite digital broadcast signal for determination of the repeater digital forwarding signal; and,
wherein the step of determining the forwarding part (DVB-H) comprises the steps:
frequency shifting and demodulating the composite digital broadcast signal to a first repeater base-band signal;
separating the first base-band signal into a first de-mapped broadcast bit stream reflecting the first digital broadcast information and a second de-mapped broadcast bit stream reflecting the second digital broadcast information by reversing a vector overlay step executed at the transmitter side assuming that first digital broadcast information (DVB-T) is mapped starting from the first channel coded broadcast bit stream onto one first constellation point of a plurality of constellation points in a first constellation diagram;

second digital broadcast information (DVB-H) is mapped starting from the second channel coded broadcast bit stream onto one second constellation point of a plurality of constellation points in a second constellation diagram; and the base-band signal is generated by vector overlay of the first constellation point and the second constellation point;

selecting the first constellation mapped broadcast bit stream or the second constellation mapped broadcast bit stream for forwarding from the repeater.

2. The method according to claim 1, characterized in that the forwarding of the composite digital broadcast signal is executed by a step of frequency shifting the composite digital broadcast signal from a first carrier frequency used at the transmitter to a second carrier frequency used at the repeater.

3. The method according to claim 1, characterized in that the step of deriving the digital repeater forwarding signal comprises the step of modulating and frequency shifting the selected first constellation mapped broadcast bit stream or second constellation mapped broadcast bit stream to a repeater forwarding carrier frequency.

4. The method according to claim 1, characterized in that the step of deriving the digital repeater forwarding signal comprises the steps:

creating a second repeater base-band signal from separated first constellation de-mapped broadcast bit stream or second constellation de-mapped broadcast bit stream; and modulating and frequency shifting the second repeater base-band signal for generation of the digital repeater forwarding signal.

5. The method according to claim 4, characterized in that the step of creating the second repeater base-band signal from the separated first constellation de-mapped broadcast bit stream or second constellation de-mapped broadcast bit stream comprises the steps:

channel decoding the de-mapped digital repeater bit stream for generating a channel decoded digital repeater bit stream; and channel recoding the channel decoded digital repeater bit stream for generation of the second repeater base-band signal.

6. The method according to claim 5, characterized in that it comprises the step of additional forward error correction before channel coding of the channel decoded repeater forwarding bit stream.

7. Repeater for distributing digital broadcast information to at least one mobile unit, characterized by:

a receiver unit adapted to receive a composite digital broadcast signal carrying first digital broadcast information according to a first digital broadcast specification (DVB-T) and second digital broadcast information according to a second digital broadcast specification (DVB-H) wherein the signal corresponding to the second digital broadcast specification (DVB-H) is overlaid onto a transmission signal carrying the first digital broadcast information using hierarchical modulation; and a forwarding unit adapted to selectively forward either the composite digital broadcast signal or a digital repeater forwarding signal carrying the first digital broadcast information or the second digital broadcast information;

wherein the forwarding unit comprises:

a splitting unit adapted to determine a forwarding part (DVB-H) from the composite digital broadcast signal reflecting a first digital broadcast information or a second digital broadcast information; and a forwarding signal generation unit adapted to deduct a non-forwarding part (DVB-T) from the composite digital broadcast signal for determination of the digital repeater forwarding signal and, wherein the splitting unit comprises:

a demodulation unit adapted to frequency shift and demodulate the composite digital broadcast signal to a first repeater base-band signal;

a separation unit adapted to separate the first base-band signal into a first constellation mapped broadcast bit stream reflecting the first digital broadcast information and a second constellation mapped broadcast bit stream reflecting the second digital broadcast information by reversing a vector overlay executed at the transmitter side assuming that first digital broadcast information (DVB-T) is mapped starting from the first channel coded broadcast bit stream onto one first constellation point of a plurality of constellation points in a first constellation diagram;

second digital broadcast information (DVB-H) is mapped starting from the second channel coded broadcast bit stream onto one second constellation point of a plurality of constellation points in a second constellation diagram; and the base-band signal is generated by vector overlay of the first constellation point and the second constellation point; and a selection unit adapted to select the first constellation mapped broadcast bit stream or the second constellation mapped broadcast bit stream for forwarding from the repeater.

8. The repeater according to claim 7, characterized in that the forwarding unit is adapted to forward the composite digital broadcast signal by frequency shifting the composite digital broadcast signal from a first carrier frequency used at the transmitter to a second carrier frequency used at the repeater.

9. The repeater according to claim 7, characterized in that the forwarding unit is adapted to frequency shift the selected first constellation mapped broadcast bit stream or second constellation mapped broadcast bit stream to a repeater forwarding carrier frequency.

10. The repeater according to claim 7, characterized in that the forwarding signal generation unit comprises:

a base-band signal reconfiguration unit adapted to create a second repeater base-band signal from separated first constellation mapped broadcast bit stream or second constellation mapped broadcast bit stream; and a modulation unit adapted to modulate and frequency shift the second repeater base-band signal for generation of the digital repeater forwarding signal.

11. The repeater according to claim 10, characterized in that the base-band signal reconfiguration unit comprises:

a channel decoder unit adapted to channel decode the de-mapped digital repeater bit stream for generating a channel decoded digital repeater bit stream; and a channel coder unit adapted to channel code the channel decoded digital repeater bit stream for generation of the second repeater base-band signal.

12. The repeater according to claim 10, characterized in that it comprises a forward error correction unit adapted to execute additional forward error correction before channel coding of the channel decoded repeater forwarding bit stream.

* * * * *